June 8, 1965     H. E. RAHM     3,187,379
FORMING A GELATINOUS SOLUTION INTO RIBBON-LIKE BODIES
Filed July 2, 1962     2 Sheets-Sheet 1
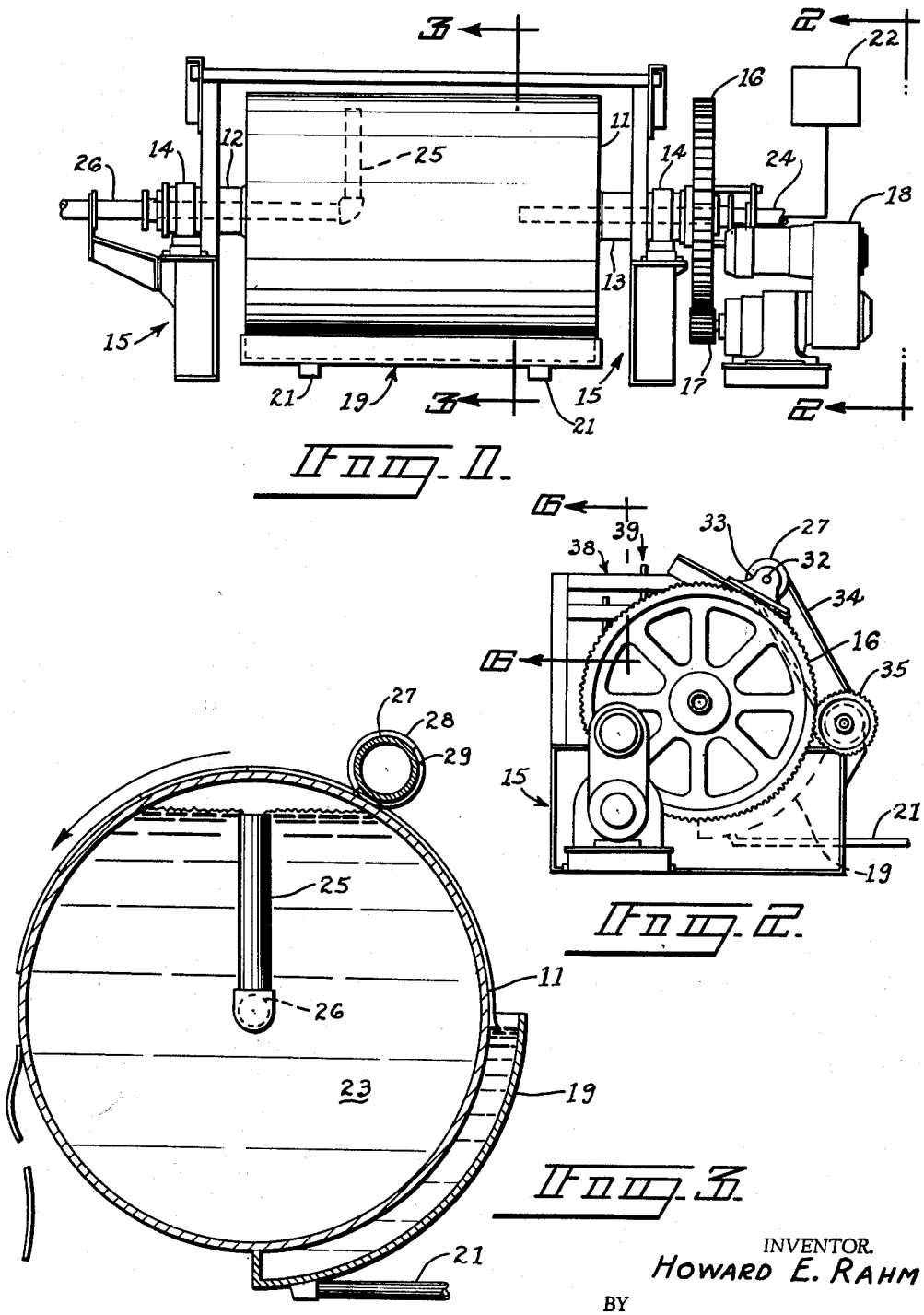
INVENTOR.
HOWARD E. RAHM
BY
Alfred L. Patmore, Jr.
ATTY.

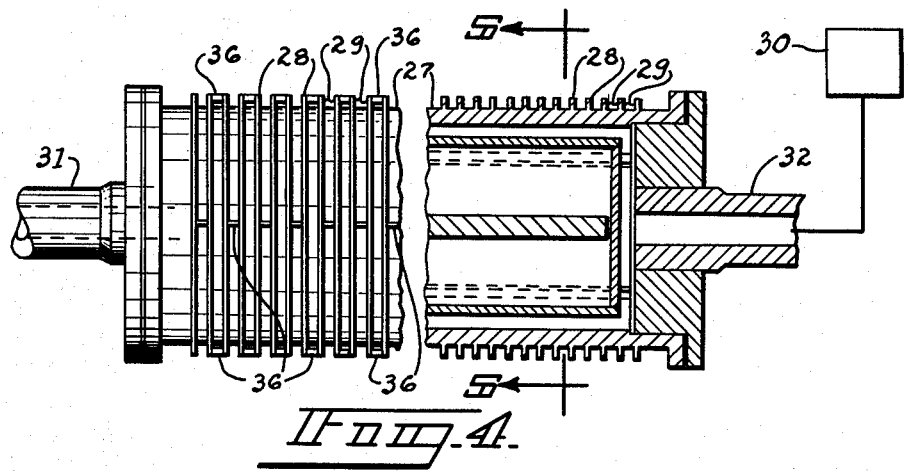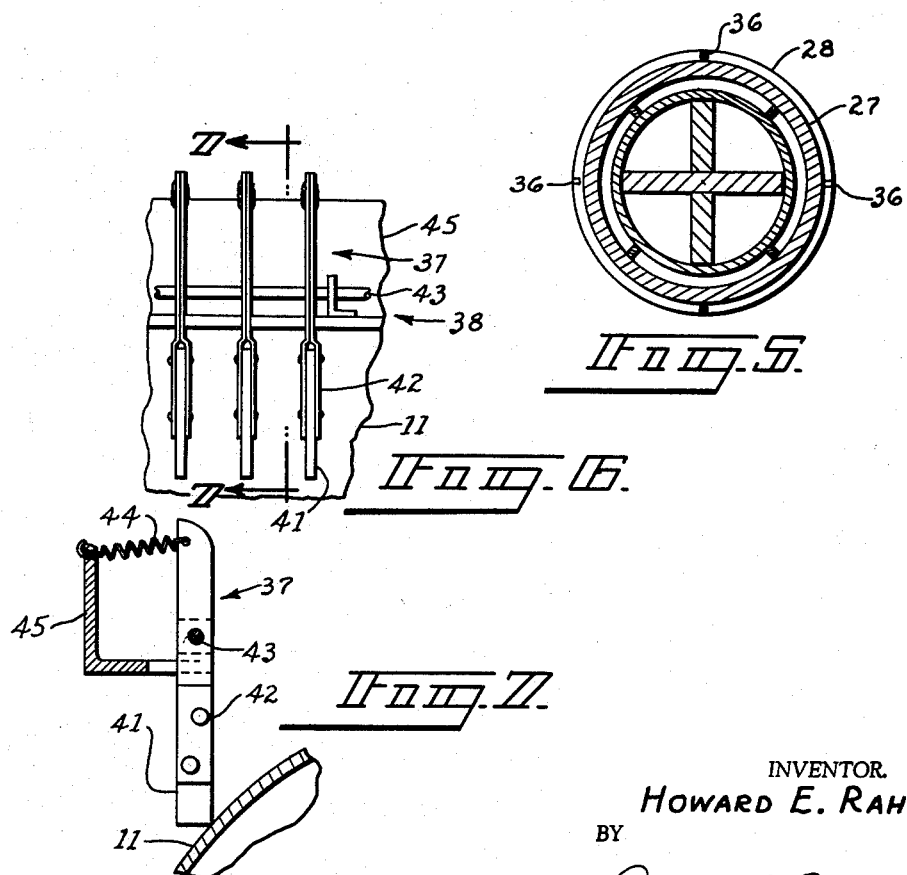

United States Patent Office 3,187,379
Patented June 8, 1965

3,187,379
FORMING A GELATINOUS SOLUTION INTO
RIBBON-LIKE BODIES
Howard E. Rahm, Toledo, Ohio, assignor to Midland-Ross Corporation, Toledo, Ohio, a corporation of Ohio
Filed July 2, 1962, Ser. No. 206,687
5 Claims. (Cl. 18—1)

This invention relates to the art of forming a solution of gelatinous material into bodies suitable for drying. More particularly, the invention relates to improved apparatus for forming a solution of gelatinous material into ribbon-like bodies which may be readily dried.

In the manufacture of gelatinous materials wherein a solution of the gelatinous material is produced it is customary for the manufacturer to dry the material prior to distribution. Apparatus and method for accomplishing the drying step are described in U.S. Patent 2,546,867 to H. E. Peck wherein the gelatinous solution is cooled to form a gel, the gel formed into a plurality of thin ribbon-like bodies by extrusion, and the ribbon-like bodies dried in a drying machine. Improved apparatus and method for extruding the gel into thin-ribbon-like bodies is described in co-pending U.S. patent application Serial Number 825,308, filed July 6, 1959 by applicant, H. E. Rahm, and coinventors G. A. Kelley and F. B. Oates which has matured into U.S. Patent 3,067,468, issued December 11, 1962 for the apparatus and a divisional application thereof which matured into U.S. Patent 3,106,747 issued October 15, 1963 for the method respectively.

It has been found that thin ribbon-like bodies of gelatinous material formed by means of extrusion even according to the improved apparatus and method of the aforesaid co-pending application Serial Number 825,308, now U.S. Patents 3,067,468 and 3,106,747 respectively, are not always satisfactory because of the inherent tendency of extrusion to cause entrapment of air in the bodies. The entrapment of air in the bodies leads to undesirable foaming when the bodies are subsequently redissolved.

It is, therefore, the object of this invention to provide apparatus for forming a gelatinous solution into ribbon-like bodies free from the defects of prior art extrusion apparatus. For a further consideration of what is considered to be novel and inventive attention is directed to the following portion of the specification, the drawing, and the appended claims.

In the drawing:

FIG. 1 is an elevational view of apparatus embodying the present invention;

FIG. 2 is an end elevational view taken on line 2—2 of FIG. 1;

FIG. 3 is a sectional view taken on line 3—3 of FIG. 1 with certain detail omitted for the sake of clarity;

FIG. 4 is a detail, shown partially in section, of an element of the apparatus of FIGS. 1–3;

FIG. 5 is a sectional view taken on line 5—5 of FIG. 4;

FIG. 6 is a fragmentary view taken on line 6—6 of FIG. 2; and

FIG. 7 is a view taken on line 7—7 of FIG. 6.

Referring in particular to FIGS. 1–3, apparatus according to the present invention comprises a hollow drum 11 having shafts 12 and 13 extending from alternate ends. Each of shafts 12 and 13 is suitably journaled in a bearing 14 which, in turn, is suitably supported on a framework illustrated generally at 15. Means are provided to rotate drum comprising a spur gear 16 attached to shaft 13 and a driving pinion 17 attached to the output shaft of a gear motor 18, preferably of the variable speed type.

A thin layer of gelatinous material is applied to the outer surface of rotating drum 11 from an arcuately shaped feed pan 19 which receives the material as a solution through feed line 21. A thin layer of gelatinous material forms on the outer surface of drum 11 in a partially gelled form by virtue of the fact that drum 11 is cooled to a temperature below the gelling temperature of the solution delivered to feed pan 19. The cooling of drum 11 is accomplished by means of a suitable coolant 23, such as ammonia or an aqueous brine solution, which is admitted to the interior thereof from a source 22, shown schematically, through inlet pipe 24 which passes through the interior of shaft 13. Coolant is withdrawn from the interior of drum 11 by means of an L-shaped outlet pipe having a vertically disposed leg 25 within the interior of drum 11 which acts as a coolant overflow weir and a horizontally disposed leg 26 which communicates with leg 25 and passes outwardly from drum 11 through shaft 12.

The thin layer of gelatinous material which is formed on drum 11 from the solution in feed pan 19, continues to gel into an increasingly more solid form as it rotates with drum 11 by virtue of the cooling effect of coolant 23. At a suitable point on the arcuate rotation of the thin film of gelatinous material on rotating drum 11 the film will have gelled to a sufficient extent to enable it to be separated into the desired ribbon-like bodies.

The separating step is accomplished by means of a separating drum 27. Separating drum 27 has an axial length generally as long as that of drum 11 but it may be of a considerably smaller diameter. Its outer surface is provided with a plurality of outwardly extending discs 28 which are disposed perpendicularly to the axis of drum 27 and equidistant from one another and which define a plurality of void spaces 29 with one another. Separating drum 27 is disposed with its axis parallel to the axis of drum 11 with the outer periphery of discs 28 in contact with the outer periphery of drum 11. Separating drum 27 is provided with shafts 31 and 32 extending from alternate ends thereof each of which is suitably journalled in a bearing 33 suitably mounted on framework 15. Means are provided to rotate separating drum 27 so that the outer periphery of discs 28 moves at a peripheral velocity equal to that of the outer periphery of drum 11. The driving means comprises a roller chain drive 34 driven by means of a pinion 35 which takes power from spur gear 17.

The thin ribbon-like bodies into which the layer of gelatinous material on drum 11 is separated by drum 27 are disposed in void spaces 29 intermediate successive discs 28. The separating action of the discs 28 of drum 27 ought preferably to involve a minimum of cutting because cutting causes the edges of the ribbon-like bodies to be ragged and leads to air entrapment. Accordingly, means are provided to heat separating drum 27 and discs 28 thereon so that the separating action of discs 28 on the gelatinous layer on drum 11 will be predominantly by localized melting. Thus, drum 27 is of hollow construction to receive a heating fluid such as hot water or steam from a source 30, shown schematically, and shafts 32 and 31 are of hollow construction to permit the ingress and egress respectively of heating fluid.

The aforesaid separating discs 28 of drum 27 serve to separate the gelatinous layer on drum 27 into ribbon-like bodies whose width is substantially equal to the distance between successive discs, i.e., to the width of void spaces 29, and whose thickness is substantially equal to the thickness of the layer of material applied to drum 11 from feed pan 19, but not greater than the depth of void spaces 29. In addition, it is desirable to separate the ribbon-like bodies to a predetermined length. Accordingly, length separating means comprising bars 36 extending between successive discs transversely across the void space 29 therebetween are provided to separate each of the ribbon-like bodies in a given void space into a plurality of bodies of a predetermined length. Each of bars 36 is in contact with two separating discs and will be heated by conduction therefrom. Thus, the separating action of bars 36 will also be predominantly by melting rather than by cutting. It is noted that the bars 36 which traverse a given void space 29 ought preferably to be offset with respect to the bars which traverse the next adjacent void space, particularly when the ribbons fall from the drum onto the drying belt. By this construction there will be less tendency for the ribbon-like bodies to clump together on the belt.

In the operation of the aforedescribed apparatus it has sometimes been noted that a thin film of the order of thickness of a spiderweb will tend to adhere to the surface of drum 11 despite the separating action of discs 28. Unless severed, this film can interfere with the effective widthwise separating effect of the apparatus. Accordingly, means comprising a plurality of separating fingers 37 adapted to exert pressure against the surface of drum 11 intermediate the ribbon-like bodies formed by separating discs 28 of separating drum 27 are provided for optimum separating effectiveness. The individual fingers 37 are disposed in at least one row, and permissably in a plurality of rows such as rows 38 and 39 with the fingers in one row offset with respect to the fingers in another row to avoid crowding. Each finger comprises a contact portion 41 formed of a material such as nylon securely held by a clamp portion 42 which is pivoted on a bar 43 disposed on an axis parallel to the axis of drum 11. The contact portion of each finger is biased toward drum 11 by means of a light biasing force from a spring 44 which has one end secured to bar 45 which, in turn, comprises a part of framework 15.

It is herein expressly noted that in the practice of this invention, it is contemplated that the separation step may be accomplished on the cooled surface of a conveyor other than the surface of an internally cooled drum. An endless metallic belt conveyor adapted to continually circumscribe a path defined by at least two pulleys disposed apart from and parallel to, one another in combination with appropriate cooling means is, therefore, an equivalent of the internally cooled drum insofar as the invention is concerned. It is also to be noted that it is not indispensable to every application of the invention that the separating discs be capable of rotation. In the event that the separating discs are not rotatable, it is not necessary that they be circular in configuration and therefore the term disc is not to be taken implying a circular configuration.

The best mode known to me to carry out this invention has been described in terms sufficiently full, clear, concise, and exact as to enable any person skilled in the art to practice the invention. However, it is understood that various modifications will be readily apparent to a skilled artisan without departing from the scope of the invention which is defined only by the appended claims.

I claim:

1. In apparatus for preparing a solution of gelatinous material to be dried comprising conveyor means having a cooled moving surface, means for applying a layer of gelatinous material to the surface of the conveyor means to be gelled thereon, improved means for separating the layer of gelatinous material into a plurality of ribbon-like bodies of given lengths comprising, in combination: a plurality of spaced apart discs disposed on an axis parallel to the cooled moving suface of the conveying means perpendicular to the direction of motion thereof, at such a distance from the cooled moving surface that a point on the periphery of each disc is substantially in contact with a point on the cooled moving surface, and at such a distance from the point of application of the gelatinous material to the conveyor means that the gelatinous material has gelled sufficiently for elongate ribbon-like bodies thereof to be self-supporting; at least one bar attached to each of successive discs traversing the space therebetween, each of said bars having a surface in line with the outer periphery of the successive discs to which it is attached; means for rotating the discs in unison; and means for heating said discs and bars, whereby the layer of gelatinuous material on the cooled moving surface will be separated into a plurality of self-supporting elongate ribbon-like bodies of given lengths at least partially by melting action.

2. Apparatus according to claim 1 wherein the discs are rotated in unison at a speed such that the linear velocity of said point on the periphery of each disc is substantially equal to the linear velocity of the point on the cooled moving surface with which said point on the periphery of the disc is substantially in contact.

3. Apparatus according to claim 1 wherein the bar that traverses the space between a first and second successive disc is offset with respect to the bar which traverses the next successive space between said second and a third successive disc.

4. In apparatus for preparing a solution of gelatinous material to be dried comprising conveyor means having a cooled moving surface, means for applying a layer of gelatinous material to the surface of the conveyor means to be gelled thereon, improved means for separating the layer of gelatinous material into a plurality of ribbon-like bodies comprising, in combination: a plurality of spaced apart discs disposed on an axis parallel to the cooled moving surface of the conveyor means perpendicular to the direction of motion thereof, at such a distance from the cooled moving surface that a point on the periphery of each disc is substantially in contact with a point on the cooled moving surface, and at such a distance from the point of application of the gelatinous material to the conveyor means that the gelatinous material has gelled sufficiently for elongate ribbon-like bodies thereof to be self-supporting; means for heating the discs, whereby the layer of gelatinous material on the cooled moving surface will be separated into a plurality of self-supporting elongate ribbon-like bodies at least partially by melting action; a plurality of separating fingers disposed in at least one row on an axis parallel to the cooled moving surface and perpendicular to the direction of motion thereof, with each of said fingers having a contact portion; and biasing means for biasing the contact portion of each separating finger toward a point on the conveying means downstream of the point on the conveying means where said discs are effective to separate the layer of gelatinous material into a plurality of ribbon-like bodies, and said fingers being located intermediate adjacent ribbon-like bodies.

5. Apparatus according to claim 4 wherein said biasing means comprises an individual spring for each separating finger adapted to bias the contact portion of each finger toward the conveying means independently of every other finger.

References Cited by the Examiner

UNITED STATES PATENTS

| 257,632 | 5/82 | Adams | 18—2 XR |
|---|---|---|---|
| 1,993,082 | 3/35 | Blair | 18—2 XR |
| 2,086,616 | 7/37 | Hansen et al. | 18—8 XR |
| 2,286,405 | 6/42 | Gordon | 18—12 XR |
| 2,316,283 | 4/43 | Piperoux et al. | 264—140 |
| 2,327,943 | 8/43 | Tiers | 264—140 XR |
| 2,349,511 | 5/44 | Miller | 18—57 |
| 2,654,123 | 10/53 | Hall | 18—1 |
| 2,662,246 | 12/53 | Klugh et al. | 18—9 XR |
| 2,697,249 | 12/54 | Bettes et al. | 18—1 |
| 2,850,769 | 9/58 | Zeigler et al. | 18—57 |
| 2,862,234 | 12/58 | Gerber | 18—15 |
| 2,927,345 | 3/60 | Hansen et al. | 18—15 |

WILLIAM J. STEPHENSON, *Primary Examiner.*

LESLIE H. GASTON, *Examiner.*